(12) United States Patent
Kakrania et al.

(10) Patent No.: US 10,937,172 B2
(45) Date of Patent: Mar. 2, 2021

(54) TEMPLATE BASED ANATOMICAL SEGMENTATION OF MEDICAL IMAGES

(71) Applicant: International Business Machines Corporation, Armonk, NY (US)

(72) Inventors: Deepika Kakrania, San Jose, CA (US); Tanveer F. Syeda-Mahmood, Cupertino, CA (US); Gopalkrishna Veni, San Jose, CA (US); Hongzhi Wang, Santa Clara, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/031,237

(22) Filed: Jul. 10, 2018

(65) Prior Publication Data
US 2020/0020106 A1 Jan. 16, 2020

(51) Int. Cl.
*G06T 7/174* (2017.01)
*G06T 3/00* (2006.01)

(52) U.S. Cl.
CPC ............ *G06T 7/174* (2017.01); *G06T 3/0068* (2013.01); *G06T 3/0093* (2013.01); *G06T 2207/20128* (2013.01); *G06T 2210/41* (2013.01)

(58) Field of Classification Search
CPC ..... G06T 7/174; G06T 3/0068; G06T 3/0093; G06T 2207/20128; G06T 2210/41
See application file for complete search history.

(56) References Cited

U.S. PATENT DOCUMENTS

| 7,957,572 B2 | 6/2011 | Von Berg et al. |
| 8,014,578 B2 | 9/2011 | Suryanarayanan et al. |

(Continued)

OTHER PUBLICATIONS

Artaechevarria et al., Efficient classifier generation and weighted voting for atlas-based segmentation: Two small steps faster and closer to the Combination Oracle, Medical Imaging 2008, Proc. of SPIE vol. 6914 69141W, pp. 1-9 (Year: 2008).*

(Continued)

*Primary Examiner* — Said M Elnoubi
(74) *Attorney, Agent, or Firm* — Stephen R. Tkacs; Stephen J. Walder, Jr.; William J. Stock

(57) ABSTRACT

A mechanism is provided in a data processing system comprising a processor and a memory, the memory comprising instructions executed by the processor to specifically configure the processor to implement a multi-atlas segmentation engine. An offline registration component performs registration of a plurality of atlases with a set of image templates to thereby generate and store, in a first registration storage device, a plurality of offline registrations. The atlases are annotated training medical images and the image templates are non-annotated medical images. The multi-atlas segmentation engine receives a target image. An image selection component selects a subset of image templates in the set of image templates based on the target image. An online registration component performs registration of the subset of image templates with the target image to generate a plurality of online registrations. The multi-atlas segmentation engine retrieves offline registrations corresponding to the subset of image templates from the first registration storage device. The multi-atlas segmentation engine performs segmentation of the target image based on the retrieved offline registrations corresponding to the subset of image templates and the plurality of online registrations. The segmentation applies labels to anatomical structures present (Continued)

in the target image based on the retrieved offline registrations and the plurality of online registrations to thereby output a modified target image.

20 Claims, 5 Drawing Sheets

(56) References Cited

U.S. PATENT DOCUMENTS

| | | | |
|---|---|---|---|
| 8,131,038 | B2 | 3/2012 | Saddi et al. |
| 8,588,495 | B2 | 11/2013 | Gupta et al. |
| 9,098,912 | B2 | 8/2015 | Kriston et al. |
| 10,162,967 | B1 | 12/2018 | Oliver et al. |
| 2008/0205716 | A1 | 8/2008 | Von Berg et al. |
| 2009/0052756 | A1 | 2/2009 | Saddi et al. |
| 2011/0142320 | A1 | 6/2011 | Gupta et al. |
| 2012/0281900 | A1 | 11/2012 | Rueckert et al. |
| 2013/0188846 | A1 | 7/2013 | Kriston et al. |
| 2014/0341449 | A1 | 11/2014 | Tizhoosh et al. |
| 2015/0131882 | A1 | 5/2015 | Mohr et al. |
| 2016/0239969 | A1 | 8/2016 | Davatzikos et al. |
| 2017/0109878 | A1 | 4/2017 | Yang et al. |
| 2018/0061091 | A1* | 3/2018 | Wang ........................ G06T 7/30 |

OTHER PUBLICATIONS

Pipitone et al., Multi-atlas segmentation of the whole hippocampus and subfields using multiple automatically generated templates, NeuroImage 101 (2014) 494-512, (Year: 2014).*

Wu et al.,Optimum template selection for atlas-based segmentation, NeuroImage 34 (2007) 1612-1618 (Year: 2007).*

Kronman et al., Image Segmentation Errors Correction by Mesh Segmentation and Deformation, International Conference on Medical Image Computing and Computer-Assisted Intervention, 2013, pp. 206-213 (Year: 2013).*

Dorr et al., High resolution three-dimensional brain atlas using an average magnetic resonance image of 40 adult C57Bl/6J mice, NeuroImage 42 (2008) pp. 60-69 (Year: 2008).*

D'Agostino, Emiliano et al., "Non-rigid atlast-to-image registration by minimization of class-conditional image entropy", Springer, Berlin, Heidelberg, International Conference on Medical Image Computing and Computer-Assisted Intervention, Mar. 2004, pp. 745-753.

Giraud, Remi et al., "An Optimized PatchMatch for multi-scale and multi-feature label fusion", NeuroImage, vol. 124, Part A, Jan. 1, 2016, 41 pages.

Liu, Cheng-Yi et al., "Deformable Templates Guided Discriminative Models for Robust 3D Brain MRI Segmentation", Springer Science+Business Media New York, Neuroinformatics, vol. 11, Issue 4, Oct. 1, 2013, pp. 447-468.

Lotjonen, Jyrki M. et al., "Fast and robust multi-atlas segmentation of brain magnetic resonance images", NeuroImage, vol. 49, Issue 3, Feb. 1, 2010, 14 pages.

McInerney, Tim et al., "Deformable Models in Medical Image Analysis: A Survey", Elsevier Inc., Medical Image Analysis, vol. 1, Issue 2, Jun. 1, 1996, pp. 91-108.

Pipotone, Jon et al., "Multi-atlas segmentation of the whole hippocampus and subfields using multiple automatically generated templates", NeuroImage, vol. 101, Nov. 1, 2014, 19 Pages.

Wachinger, Christian et al., "Atlas-Based Under-Segmentation", Med Image Comput Comput Assist Interv. 2014, 11 pages.

Wang, Hongzhi et al., "Multi-atlas Segmentation with Robust Label Transfer and Label Fusion", Proceedings of the 23rd International Conference on Information Processing in Medical Imaging, IPMI 2013, Asilomar, CA, USA, Jun. 28-Jul. 3, 2013, 12 pages.

Wu, Minjie et al., "Optimum template selection for atlas-based segmentation", NeuroImage, vol. 34, Issue 4, Feb. 15, 2007, 7 Pages.

Zhuang, X et al., "Whole Heart Segmentation of Cardiac MRI Using Multiple Path Propagation Strategy", Medical Image Computing and Computer-Assisted Intervention—MICCAI 2010, 13th International Conference, Beijing, China, Sep. 20-24, 2010, Proceedings Part I, 9 pages.

List of IBM Patents or Patent Applications Treated as Related, Jan. 23, 2019, 2 pages.

* cited by examiner

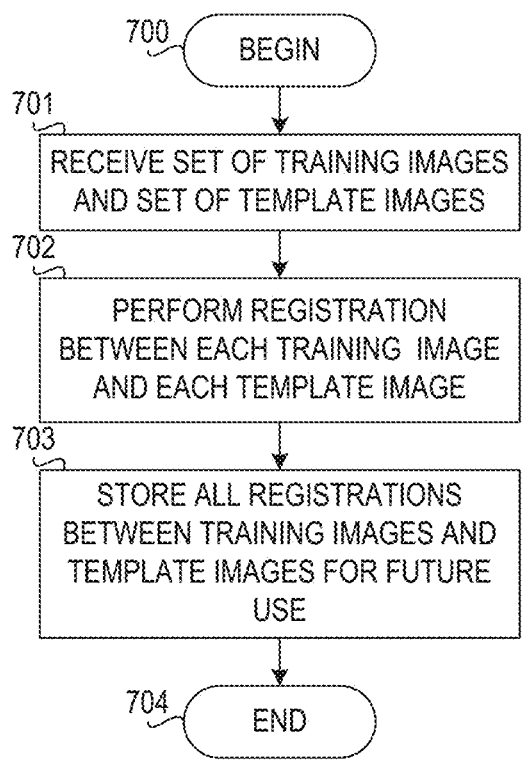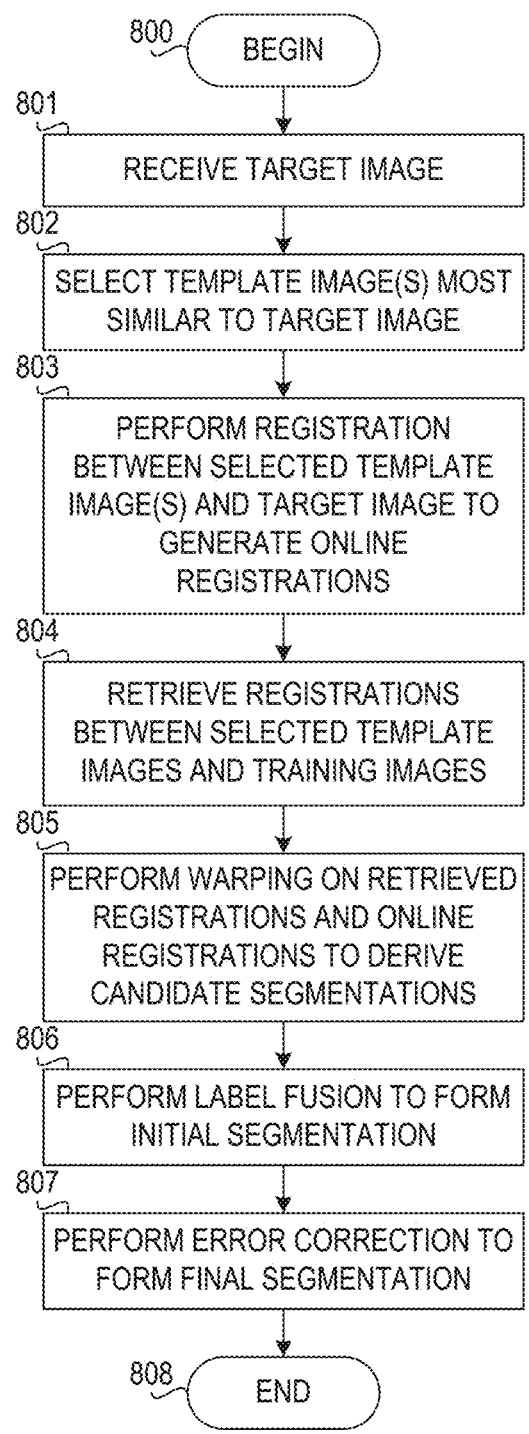

TEMPLATE BASED ANATOMICAL SEGMENTATION OF MEDICAL IMAGES

BACKGROUND

The present application relates generally to an improved data processing apparatus and method and more specifically to mechanisms for template based anatomical segmentation of medical images.

Multi-atlas segmentation (MAS) is becoming one of the most widely-used and successful image segmentation techniques in biomedical applications. By manipulating and utilizing an entire dataset of "atlases" (training images that have been previously labeled, e.g., manually by an expert), rather than some model-based average representation, multi-atlas segmentation has the flexibility to better capture anatomical variation, thus offering superior segmentation accuracy. This benefit, however, typically comes at a high computational cost. Recent advancements in computer hardware and image processing software have been instrumental in addressing this challenge and facilitated the wide adoption of multi-atlas segmentation. Today, multi-atlas segmentation has come a long way, and the approach includes a wide array of sophisticated algorithms that employ ideas from machine learning, probabilistic modeling, optimization, and computer vision, among other fields.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions executed by the processor to specifically configure the processor to implement a multi-atlas segmentation engine. The method comprises performing, by an offline registration component executing within the multi-atlas segmentation engine, registration of a plurality of atlases with a set of image templates to thereby generate and store, in a first registration storage device, a plurality of offline registrations, wherein the atlases are annotated training medical images and the image templates are non-annotated medical images. The method further comprises receiving, by the multi-atlas segmentation engine, a target image. The method further comprises selecting, by an image selection component executing within the multi-atlas segmentation engine, a subset of image templates in the set of image templates based on the target image. The method further comprises performing, by an online registration component executing within the multi-atlas segmentation engine, registration of the subset of image templates with the target image to generate a plurality of online registrations. The method further comprises retrieving, by the multi-atlas segmentation engine, offline registrations corresponding to the subset of image templates from the first registration storage device. The method further comprises performing, by the multi-atlas segmentation engine, segmentation of the target image based on the retrieved offline registrations corresponding to the subset of image templates and the plurality of online registrations, wherein the segmentation applies labels to anatomical structures present in the target image based on the retrieved offline registrations and the plurality of online registrations to thereby output a modified target image.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided, The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of an offline stage of a system for template based anatomical segmentation of medical images in accordance with an illustrative embodiment; and FIG. 8 is a flowchart illustrating operation of an online stage of a system for template based anatomical segmentation of medical images in accordance with an illustrative embodiment.

DETAILED DESCRIPTION

Figure 1:
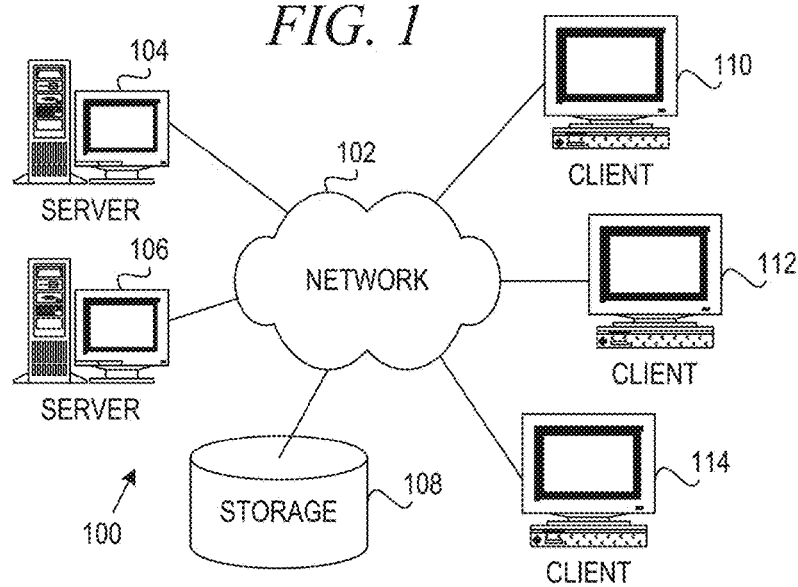
FIG. 1 is an example diagram of a distributed data processing system in which aspects of the illustrative embodiments may be implemented.

Multi-atlas label fusion (MALF) is a powerful technique for anatomy segmentation. This method relies on registration-based anatomy alignment to propagate anatomical labels from pre-labeled training images, i.e. atlases, to a target image and applies label fusion to reduce atlas propagation errors. Template-based atlas propagation is commonly used for reducing registration cost in multi-atlas label fusion. Using this approach, instead of directly computing registration between each atlas and a target image, the pairwise registration is achieved through registering each image to a common template. Since registrations between atlases to the template can be calculated offline, only one online deformable registration between the template and a target image is needed.

To apply template-based propagation, typically one common template is applied for atlas propagation for every target image. Although this scheme has been widely applied, it often results in prominently less accurate atlas propagation than conventional atlas propagation. To address this problem, the illustrative embodiments propose to employ a template library that contains a large number of images sampled from the target population. Given a target image, one template is selected from the template library for optimal atlas propagation for the target image. In an application of cardiac CT segmentation, the mechanism of the illustrative embodiments significantly outperforms standard common template based atlas propagation. Furthermore, only taking a small fraction of computation time for atlas propagation, the mechanism of the illustrative embodiments produces comparable results to standard multi-atlas label fusion that uses pairwise deformable registrations, Before beginning the discussion of the various aspects of the illustrative embodiments, it should be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that, the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present, That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
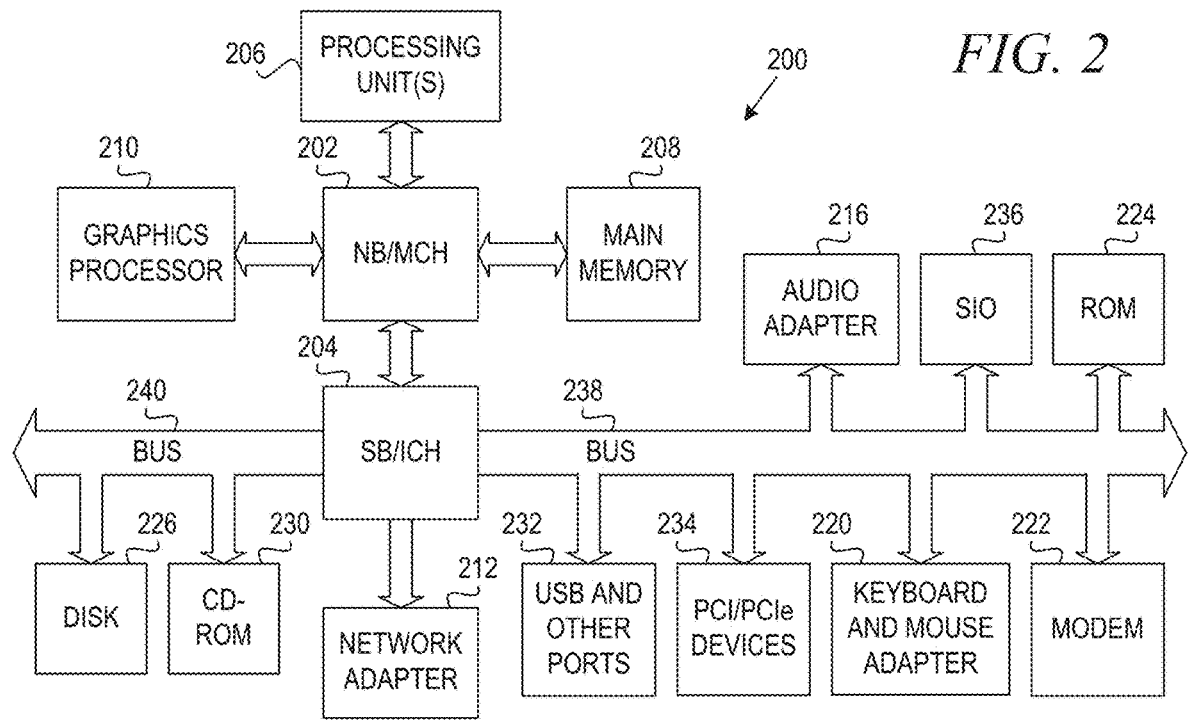
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a system for template based anatomical segmentation of medical images. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments, It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates template based anatomical segmentation of medical images.

As noted above, the mechanisms of the illustrative embodiments utilize specifically configured computing devices, or data processing systems, to perform the operations for template based anatomical segmentation of medical images. These computing devices, or data processing systems, may comprise various hardware elements Which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the system for template based anatomical segmentation of medical images.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
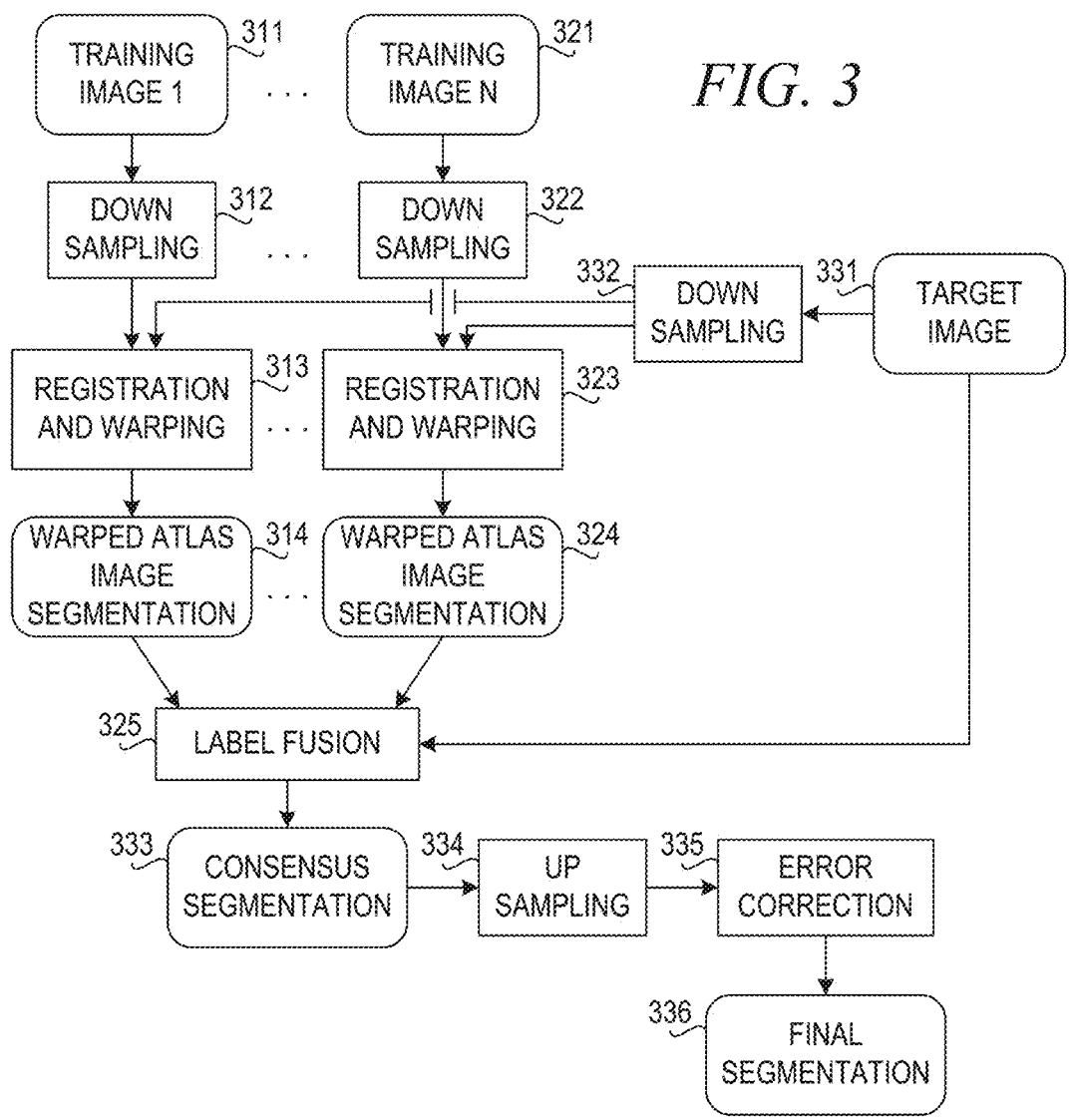
FIG. 3 is a block diagram illustrating a mechanism for multi-atlas segmentation with pairwise deformable registration.

FIG. 3 is a block diagram illustrating a mechanism for multi-atlas segmentation with pairwise deformable registration. In previous anatomy segmentation mechanisms, training images (atlases) that are annotated with labels are obtained and deformable registration (also referred to herein as simply a "registration") is performed between each of the atlases and a target image in order to perform multi-atlas segmentation. This process is computationally intensive and is not suitable for large scale medical image studies. In order to address this, multi-atlas segmentation provides a mechanism for performing multi-atlas segmentation with pairwise deformable registration in a down-sampled coarse scale space followed by learning-based error correction in the original space.

This solution obtains training images (atlases) 311, 321 that are annotated with labels, performs down sampling 312, 322 on the atlases 311, 321. The mechanism also performs down sampling 332 on the target image 331 and then performs registration and warping 313, 323 to generate warped atlas image segmentations 314, 324. The mechanism performs label fusion 325 of the segmented warped atlas images 314, 324 to generate consensus segmentation 333. Then, the mechanism performs up-sampling 334 and error correction 335 to generate the final segmentation 336.

Figure 4:
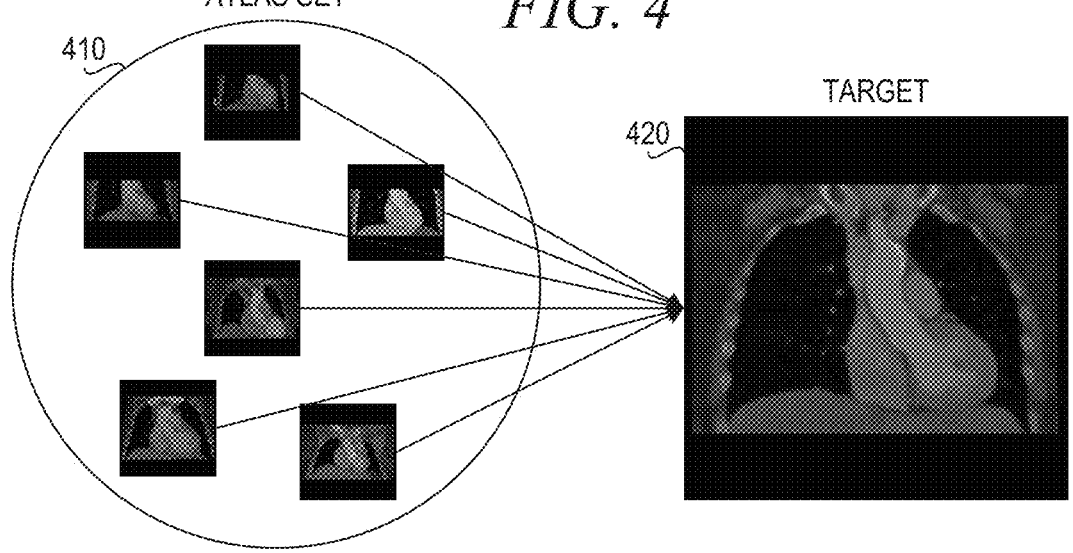
FIG. 4 illustrates multi-atlas segmentation with pairwise deformable registration.

FIG. 4 illustrates multi-atlas segmentation with pairwise deformable registration. While this solution of applying multi-atlas segmentation in a coarse scale followed by learning-based error correction in the native scale space can significantly reduce the overall computational cost, without sacrificing segmentation accuracy, the atlas registration process may take 70% or more of the computation time. This is due to the fact that each atlas image must still be registered with the target image 420, i.e., an N-deformable registration is required, where N is the number of training images (or atlases) 410. In order to increase the speed of anatomy segmentation and reduce memory size requirements, down sampling is utilized, which reduces the resolution making the registration less accurate for small structures. In some cases, entire structures may be missed due to the down sampling to the coarse scale space, i.e., small labels may be completely lost as a result of the down-sampling.

Multi-atlas label fusion (MALF) is a powerful technique for anatomy segmentation. This technique relies on registration-based anatomy alignment to propagate anatomical labels from pre-labeled training images, i.e., atlases, to a target image and applies label fusion to reduce atlas propagation errors.

Template-based atlas propagation is used for reducing registration cost in MALF. Using this approach, instead of directly computing registration between each atlas and a target image, the pairwise registration is achieved through registering each image to a common template. Since registrations between atlases to the template can be calculated offline, only one online deformable registration between the template and a target image is needed.

To apply template-based propagation, typically one common template is applied for atlas propagation for every target image. This technique often results in prominently less accurate atlas propagation than conventional atlas propagation. To address this problem, the illustrative embodiments propose to employ a template library that contains a large number of images sampled from the target population. Given a target image, one or more templates are selected from the template library for optimal atlas propagation for the target image.

Thus, faster atlas propagation can be achieved by: 1) using cheaper but less accurate registrations to replace deformable registration; or 2) reducing the number of online registrations. Employing less accurate registrations often substantially sacrifice accuracy. For instance, a recent work along this line affinely warps images to common templates and applies learning-based refinement, which still underperforms deformable registration based multi-atlas segmentation.

Reducing online registrations can be achieved by atlas selection and/or template based propagation. Atlas selection aims to select a subset of atlases that are likely to produce accurate label propagation for a target image. However, its capability on reducing registration cost is limited as a fairly large number of atlas images are still needed to be selected to prevent performance drop.

Template-based atlas propagation is indirect propagation based on composing registrations along a registration path through intermediate image(s). Indirect propagation has been applied for improving atlas propagation accuracy. For example, each atlas is propagated through multiple registration paths to improve the chance that atlas information is accurately propagated at least once. With manifold learning, instead of the brute force approach, efficiency can be improved by decomposing a difficult-to-estimate large deformation between two images into a series of easier-to-estimate smaller deformations represented by intermediate propagation images/templates. When applied for reducing registration cost, the indirect registration scheme is only applied through common template(s) based atlas propagation. The illustrative embodiments focus on choosing optimal propagation template(s) for template-based propagation.

Figure 5:
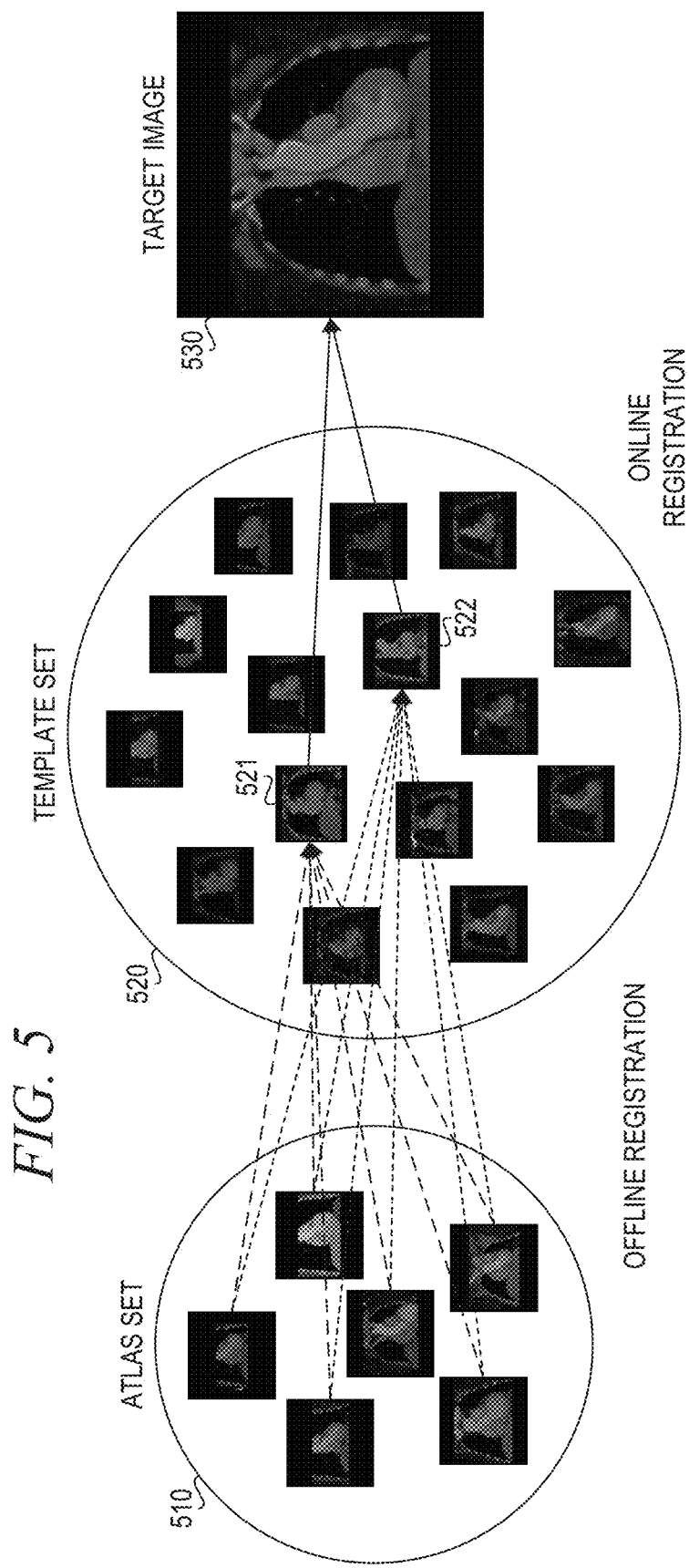
FIG. 5 illustrates template based anatomical segmentation of medical images in accordance with an illustrative embodiment.

FIG. 5 illustrates template based anatomical segmentation of medical images in accordance with an illustrative embodiment. In the depicted example, a mechanism is provided that reduces the N deformable registration requirement to an X deformable registration requirement, which greatly reduces the amount of time required to perform the anatomy segmentation without losing accuracy (where X is significantly smaller than N and, in an example embodiment is reduced to a 2 deformable registration requirement). The mechanism further provides a multi-scale label fusion scheme that combines high-resolution warped atlas segmentations and low-resolution warped atlas images which works well for small structures. Thus, the illustrative embodiment solves the two main drawbacks of prior anatomy segmentation mechanisms, i.e., long computational times due to N deformable registration requirements, and loss of accuracy with regard to small scale structures due to down sampling.

The N deformable registration requirement solution is to perform offline registrations of training images (or atlases) 510 with templates in a template set 520 with these registrations being able to be reused for various target images 530. The term "offline," as used herein, refers to a phase of operation during which a given target image is not being registered on demand and during which speed is not an issue. Conversely, the term "online," as used herein, refers to a phase of operation during which a given target image is being registered on demand and during which speed is an issue. The templates 520 are non-annotated real subject images, like the target images 530, which are selected to build a template set or library. In one embodiment, images in the template set 520 are selected randomly; however, other techniques for selecting the template set 520 may be used depending upon the implementation. A pairwise deformable registration is performed offline between each atlas (annotated training image) 510 and each template image 520.

Online registration involves matching the target image 530 with the top X ranking similar templates 521, 522 to the target image 530, where X=2 in the depicted example. Deformable registration between the selected templates 521, 522 and the target image 530 is then performed. The selection of the templates may be performed at a lower spatial resolution or through hash random forest.

Pairwise registration between each atlas image corresponding to the selected template images 521, 522, and the target image 530, may be produced by composing (1) the registrations between atlases and the selected templates and (2) the registrations between the selected templates and the target image. Thus, online registration processing is reduced to X (e.g., 2) deformable registrations corresponding to the top X highest ranking similar templates. The offline registration of the templates with the training atlases allows for the high-resolution training image labels to be applied to the target image 530 via the lower resolution registration with the templates 521, 522. Moreover, the offline registration is reusable with various target images.

Figure 6:
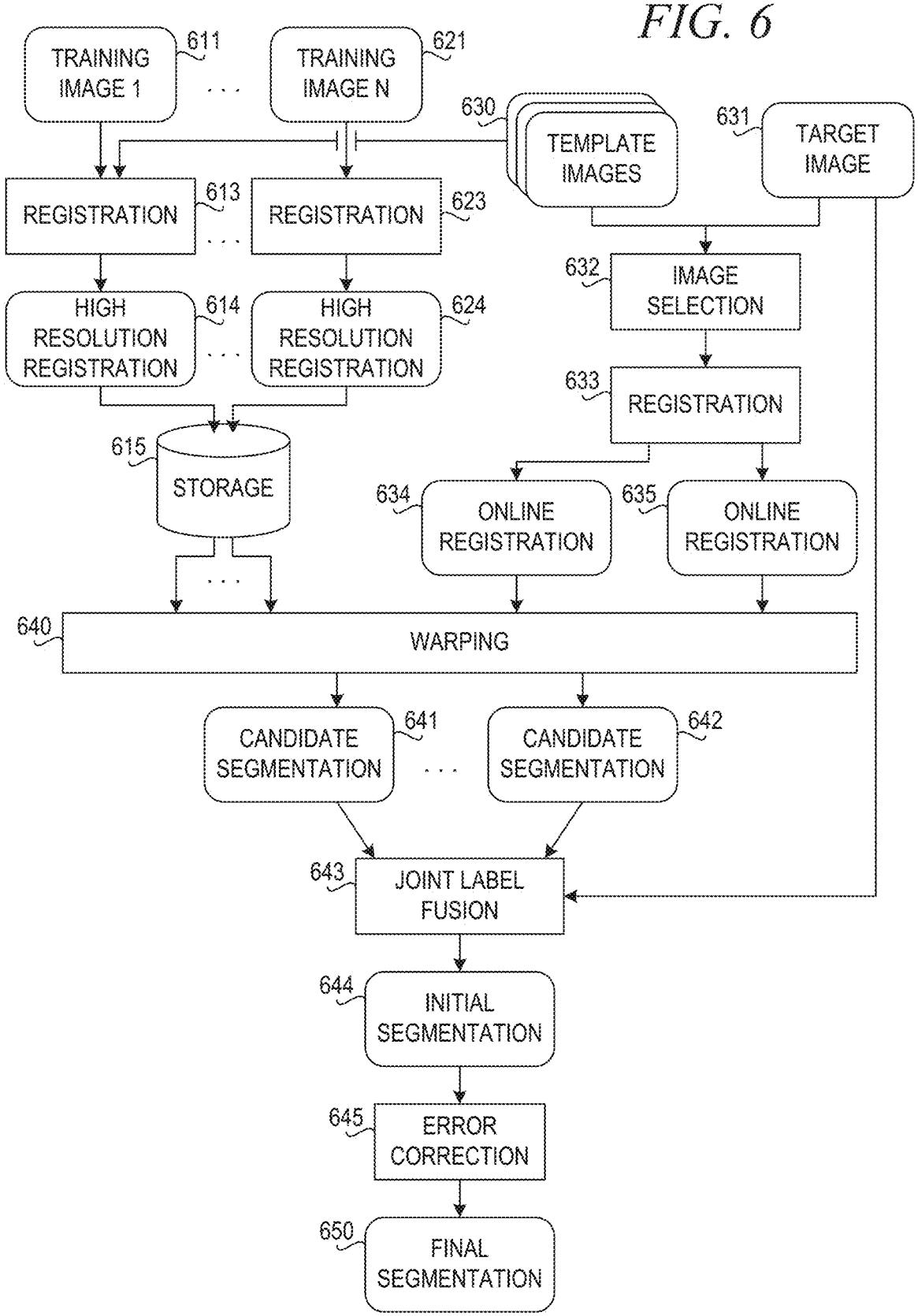
FIG. 6 is a block diagram of a system for template based anatomical segmentation of medical images in accordance with an illustrative embodiment.

FIG. 6 is a block diagram of a system for template based anatomical segmentation of medical images in accordance with an illustrative embodiment. As shown in FIG. 6, the template based anatomical segmentation has two different registration stages: an offline registration stage (blocks 611-624) and an online registration stage (blocks 630-650). The system utilizes a template set 630 that bridges the two registration stages. The template set 630 is a set of real images, like the target image 631, that are not annotated, and which are selected from a larger set of real images. In one embodiment, template images 630 may be randomly selected from a larger set of real images, although other selection techniques may be used based on the implementation. A library of atlas images (annotated training images) 611, 621 is also provided.

In a first "offline" registration stage, registration components 613, 623 perform pairwise deformable registration between each of the atlas images 611, 621 and each of the template images 630 in the template set to thereby generate first registrations 614, 624, which correlate atlas images 611, 621 with the template images 630 in the template set. As used herein, registration is the process of aligning one image to another, such as aligning each training image 611 to each template image 630 in the offline registration stage of the depicted embodiment. The result of registration is a correspondence map between the two registered images. The correspondence map represents the information on how each pixel in one image should be mapped to pixels in the other image. These registrations (correspondence maps) are stored in registration storage device 615 for later use in performing segmentation of a target image 631 using the mechanisms of the illustrative embodiment. In the depicted example, the registration components 613, 623 perform the alignment of high resolution images, thus producing high resolution registrations 614, 624. These registrations 614, 624 may be retrieved and reused for various target image segmentations.

The stored registrations in registration storage device 615 are the correspondence maps calculated between each training image and each template image. Thus, if there are N training images and Y template images, then there will be N*Y registrations 614, 624 stored in registration storage device 615. Note that for the template images, it is not necessary to warp atlas (training) segmentations to them; therefore, there is no segmentation for the template images to be stored.

In the second "online" registration stage, image selection component 632 selects X number of templates from the template set 630, where X is a selectable value that is significantly less than the total number of templates, Y, in the template set 630. In one example embodiment, X is set to a value of 2. The templates that are selected are the top X templates that are most similar to the target image 640. This selection may be performed, for example, through a lower spatial resolution registration process using down sampling. In an alternative embodiment, a hash random forest based process or the like may be used.

Online registration component 633 performs an online registration process between the selected X number of template images and the target image 631 to thereby generate a second set of online registrations 634, 635. In one embodiment, online registration 633 performs low resolution registration using down sampling, which works well for small anatomical structures. In an alternative embodiment, online registration 633 may perform high resolution registration, because the number of registrations is greatly reduced, thereby decreasing the cost of online registration.

Warping component 640 retrieves registrations from registration storage device 615 corresponding to the selected template images from template images 630 selected by image selection component 632. Thus, in the depicted example, if we have N training images and X selected template images, then warping component 640 retrieves registrations aligning each training image to each selected template image, resulting in N*X retrieved offline registrations. Warping component 640 then applies the correspondence maps of the corresponding registrations to the correspondence maps of the online registrations 634, 635 to align the training images to the target image, resulting in a set of correspondence maps that align the training images to the target image. Warping component 640 then warps the segmentation of each training image 611, 621 to the target image 631 using the resulting correspondence maps that align the training images to the target image. Thus, warping component 640 propagates the segmentations from the training images to the target image through the intermediate registrations of the template images.

As an example, consider there are three images, A, B, and C. Registration between A and B will produce a correspondence map between A and B. Registration between B and C will produce a correspondence map between B and C. With these results, warping component 640 does not have to perform registration between image A and image C to find out their correspondence map. An easier way to find out the correspondence map (registration) between A and C is to combine the correspondence map between A and B and the correspondence map between B and C. Warping component 640 can then use the result to warp the segmentation of image A to image C. Note that there is no need to save the warped segmentation from A to B.

Thus, warping component 640 propagates the labels from the corresponding atlases, as indicated by the high-resolution registrations 614, 624 from the offline registrations, based on the online registrations 634, 635. Joint label fusion 643 combines the candidate segmentations 641, 642 to generate initial segmentation 644. Error correction component 645 corrects errors in the initial segmentation 644 to generate final segmentation 650. Thus, a multi-atlas anatomical segmentation 650 is achieved with only X deformable online registrations being needed between the target image 631 and the template set 630. The labels for anatomical structures in the target image are obtained via the propagation of the N number of offline registrations of the atlas images to the X number of template images.

The multi-atlas label fusion mechanism of the illustrative embodiment, thus, combines high-resolution warped atlas segmentations and low-resolution warped atlas images, which works well for small anatomical structures. With multi-scale label fusion, deformable registration may be done in a low resolution and atlas segmentation may be warped in the original high spatial resolution to avoid aliasing artifacts. Atlas images may be warped in lower resolution, but higher than registration resolution so that image features are better preserved. The label fusion directly works with different resolution warped atlas images and atlas segmentations.

Since registrations from any template to a target image are independently calculated, if the propagating templates are conditionally independent from each other given the target image, the additional atlas propagation errors caused by registration composition produced by different propagating templates are independent as well. Such independent errors can be effectively corrected by label fusion. Hence, employing a small number of templates for atlas propagation can potentially completely remove the performance gap between template-based atlas propagation label fusion and direct atlas propagation label fusion.

Template selection aims to quickly select a template that has small registration error to a target image from a large template library. Template selection is not a problem that needs to be addressed by prior art based on common template. Although atlas selection has similar goals, template selection has the following unique challenges: 1) to ensure small registration error from at least one template image to any given target image, the template set may contain more images than a typically applied atlas set; and 2) template selection needs to have low computational cost comparing to deformable registration to achieve the goal of reducing overall computational cost for atlas propagation, especially given that the template-target propagation is done online.

Since predicting image registration performance from input images is difficult, so far the most reliable method for estimating registration errors between two images requires actually applying registration and warping between the two images. Image similarity measures such as summed squared errors (SSD) or normalized mutual information (NMI) over the region of interest between two registered images are employed as a surrogate for registration accuracy for template ranking.

To reduce computational cost for estimating deformable registration accuracy, one common technique is to apply affine registration between two images to estimate the performance of deformable registration. However, computing affine registration from a large template set to a target image is still time consuming. To address this problem, an illustrative embodiment may conduct template selection in a down sampled image space. Since image registration has computational complexity proportional to image size, down sampling images into smaller image sizes can substantially improve the processing speed. Both template images and a target image may be resampled into a coarse spatial resolution such that deformable image registration between a pair of images can be finished within a few seconds, keeping the total computational cost for template selection only a small fraction of that for a single deformable registration in the original spatial resolution.

After template selection, deformable registration to a target image in the original space is only calculated for the top ranked templates. The deformable registrations calculated in the down sampled space can be used as initialization to ensure good registration in the original space. Finally, each atlas is propagated to a target image through each of the selected templates for label fusion.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically-encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 7 is a flowchart illustrating operation of an offline stage of a system for template based anatomical segmentation of medical images in accordance with an illustrative embodiment. Operation begins (block 700), and the system receives a labeled set of training (atlas) images and a set of template images (block 701). The training images are annotated with segmentations. The system performs pairwise deformable registration between each training (atlas) image and each template image (block 702). The system then stores the resulting high resolution registrations as correspondence maps (block 703). Thereafter, operation ends (block 704).

FIG. 8 is a flowchart illustrating operation of an online stage of a system for template based anatomical segmentation of medical images in accordance with an illustrative embodiment. Operation begins (block 800), and the system receives a target image (block 801). The system selects one or more template image(s) most similar to the target image (block 802). The system performs online registration between the selected template image(s) and the target image to generate second registrations (block 803). The system retrieves the high resolution registrations for the selected target image(s) (block 804).

Then, the system performs warping on retrieved registrations and online registrations to derive candidate segmentations (block 805). Warping propagates the labels from the corresponding atlases, as indicated by the offline registrations, based on the online registrations. The system then performs label fusion on the candidate segmentations to form an initial segmentation (block 806). Joint label fusion combines the candidate segmentations to generate the initial segmentation. The system performs error correction to form a final segmentation (block 807). Error correction corrects errors in the initial segmentation to generate the final segmentation. Thereafter, operation ends (block 808).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or early out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions executed by the processor to specifically configure the processor to implement a multi-atlas segmentation engine, the method comprising:

performing, by an offline registration component, executing within the multi-atlas segmentation engine, registration of a plurality of atlases with a set of image templates to thereby generate and store, in a first registration storage device, a plurality of offline registrations, wherein the atlases are annotated training medical images and the image templates are non-annotated medical images;

receiving, by the multi-atlas segmentation engine, a target image;

selecting, by an image selection component executing within the multi-atlas segmentation engine, a subset of image templates in the set of image templates based on the target image. wherein selecting the subset of image templates comprises selecting two or more image templates determined to be most similar to the target image based on a low spatial resolution registration of image templates in the set of image templates with the target image;

performing, by an online registration component executing within the multi-atlas segmentation engine, registration of the subset of image templates with the target image to generate a plurality of online registrations;

retrieving, by the multi-atlas segmentation engine, offline registrations corresponding to the subset of image templates from the first registration storage device; and performing, by the multi-atlas segmentation engine, segmentation of the target image based on the retrieved offline registrations corresponding to the subset of image templates and the plurality of online registrations, wherein the segmentation applies labels to anatomical structures present in the target image based on the retrieved offline registrations and the plurality of online registrations to thereby output a modified target image.

2. The method of claim 1, wherein performing segmentation of the target image further comprises:

propagating atlas segmentations of the plurality of atlases to the target image by correlation of the retrieved offline registrations from each atlas to a selected image template in the subset of image templates with an online registration from the selected image template to the target image.

3. The method of claim 1, wherein the subset of image templates comprises more than one image template from the set of image templates and less than a total number of image templates in the set of image templates.

4. The method of claim 1, wherein the subset of image templates are non-annotated real medical target images selected from a set of real medical target images to be image templates for segmentation.

5. The method of claim 1, wherein performing segmentation of the target image further comprises:

performing, by a warping component executing within the multi-atlas segmentation engine, warping on the retrieved offline registrations and the set of online registrations to form a set of candidate segmentations; and performing, by a label fusion component executing within the multi-atlas segmentation engine, label fusion on the set of candidate segmentations to form an initial segmentation.

6. The method of claim 5, wherein performing warping on the retrieved offline registrations and the set of online registrations comprises:

combining correspondence maps from the retrieved offline registrations and correspondence maps from the set of online registrations to derive a correspondence map between the plurality of atlases and the target image.

7. The method of claim 1, wherein performing segmentation of the target image further comprises performing error correction on the initial segmentation to form a final segmentation.

8. The method of claim 1, Wherein performing registration of the plurality of atlases with the set of image templates comprises performing high-resolution registration.

9. The method of claim 1, wherein performing registration of the subset of image templates with the target image comprises performing low-resolution registration.

10. A computer program product comprising a computer readable storage medium having a computer readable program stored therein, wherein the computer readable program, when executed on a processor of a data processing system, causes the data processing system to implement a multi-atlas segmentation engine, wherein the computer readable program causes the data processing system to:
  perform, by an offline registration component executing within the multi-atlas segmentation engine, registration of a plurality of atlases with a set of image templates to thereby generate and store, in a first registration storage device, a plurality of offline registrations, wherein the atlases are annotated training medical images and the image templates are non-annotated medical images;
  receive, by the multi-atlas segmentation engine, a target image;
  select, by an image selection component executing within the multi-atlas segmentation engine, a subset of image templates in the set of image templates based on the target image. wherein selecting the subset of image templates comprises selecting two or more image templates determined to be most similar to the target image based on a low spatial resolution registration of image templates in the set of image templates with the target image;
  perform, by an online registration component executing within the multi-atlas segmentation engine, registration of the subset of image templates with the target image to generate a plurality of online registrations;
  retrieve, by the multi-atlas segmentation engine, offline registrations corresponding to the subset of image templates from the first registration storage device; and
  perform, by the multi-atlas segmentation engine, segmentation of the target image based on the retrieved offline registrations corresponding to the subset of image templates and the plurality of online registrations, wherein the segmentation applies labels to anatomical structures present in the target image based on the retrieved offline registrations and the plurality of online registrations to thereby output a modified target image.

11. The computer program product of claim 10, wherein performing segmentation of the target image further comprises:
  propagating atlas segmentations of the plurality of atlases to the target image by correlation of the retrieved offline registrations from each atlas to a selected image template in the subset of image templates with an online registration from the selected image template to the target image.

12. The computer program product of claim 10, wherein the subset of image templates comprises more than one image template from the set of image templates and less than a total number of image templates in the set of image templates.

13. The computer program product of claim 10, wherein the subset of image templates are non-annotated real medical target images selected from a set of real medical target images to be image templates for segmentation.

14. The computer program product of claim 10, wherein performing segmentation of the target image further comprises:
  performing, by a warping component executing within the multi-atlas segmentation engine, warping on the retrieved offline registrations and the set of online registrations to form a set of candidate segmentations; and
  performing, by a label fusion component executing within the multi-atlas segmentation engine, label fusion on the set of candidate segmentations to form an initial segmentation.

15. The computer program product of claim 14, wherein performing warping on the retrieved offline registrations and the set of online registrations comprises:
  combining correspondence maps from the retrieved offline registrations and correspondence maps from the set of online registrations to derive a correspondence map between the plurality of atlases and the target image.

16. The computer program product of claim 10, wherein performing segmentation of the target image further comprises performing error correction on the initial segmentation to form a final segmentation.

17. The computer program product of claim 10, wherein performing registration of the plurality of atlases with the set of image templates comprises performing high-resolution registration and wherein performing registration of the subset of image templates with the target image comprises performing low-resolution registration.

18. An apparatus comprising:
  a processor; and
  a memory coupled to the processor, wherein the memory comprises instructions which, when executed by the processor, cause the processor to implement a multi-atlas segmentation engine, wherein the instructions cause the processor to:
  perform, by an offline registration component executing within the multi-atlas segmentation engine, registration of a plurality of atlases with a set of image templates to thereby generate and store, in a first registration storage device, a plurality of offline registrations, wherein the atlases are annotated training medical images and the image templates are non-annotated medical images;
  receive, by the multi-atlas segmentation engine, a target image;
  select, by an image selection component executing within the multi-atlas segmentation engine, a subset of image templates in the set of image templates based on the target image, wherein selecting the subset of image templates comprises selecting two or more image templates determined to be most similar to the target image based on a low spatial resolution registration of image templates in the set of image templates with the target image;
  perform, by an online registration component executing within the multi-atlas segmentation engine, registration of the subset of image templates with the target image to generate a plurality of online registrations;
  retrieve, by the multi-atlas segmentation engine, offline registrations corresponding to the subset of image templates from the first registration storage device; and
  perform, by the multi-atlas segmentation engine, segmentation of the target image based on the retrieved offline registrations corresponding to the subset of image templates and the plurality of online registrations, wherein the segmentation applies labels to anatomical structures present in the target image based on the retrieved offline registrations and the plurality of online registrations to thereby output a modified target image.

19. The apparatus of claim 18, wherein the subset of image templates comprises more than one image template from the set of image templates and less than a total number of image templates in the set of image templates.

20. The apparatus of claim 18, wherein the subset of image templates are non-annotated real medical target images selected from a set of real medical target images to be image templates for segmentation.

* * * * *